(12) United States Patent
Fink et al.

(10) Patent No.: US 9,734,391 B2
(45) Date of Patent: Aug. 15, 2017

(54) SYSTEMS AND METHODS OF GESTURE RECOGNITION

(71) Applicants: Ryan Fink, Vancouver, WA (US); Ryan Phelps, Portland, OR (US); Gary Peck, Portland, OR (US)

(72) Inventors: Ryan Fink, Vancouver, WA (US); Ryan Phelps, Portland, OR (US); Gary Peck, Portland, OR (US)

( * ) Notice: Subject to any disclaimer, the term of this patent is extended or adjusted under 35 U.S.C. 154(b) by 0 days.

(21) Appl. No.: 14/796,944

(22) Filed: Jul. 10, 2015

(65) Prior Publication Data

US 2016/0012281 A1    Jan. 14, 2016

Related U.S. Application Data

(60) Provisional application No. 62/023,667, filed on Jul. 11, 2014.

(51) Int. Cl.
| | |
|---|---|
| *G06K 9/00* | (2006.01) |
| *G06F 3/01* | (2006.01) |
| *G06F 1/16* | (2006.01) |
| *G06F 3/03* | (2006.01) |

(52) U.S. Cl.
CPC ......... *G06K 9/00355* (2013.01); *G06F 1/163* (2013.01); *G06F 3/011* (2013.01); *G06F 3/017* (2013.01); *G06F 3/0304* (2013.01); *G06F 2203/04806* (2013.01)

(58) Field of Classification Search
CPC .................................................. G06K 9/00355
See application file for complete search history.

(56) References Cited

U.S. PATENT DOCUMENTS

| | | | | |
|---|---|---|---|---|
| 2008/0085048 | A1* | 4/2008 | Venetsky | G06K 9/00355 382/153 |
| 2010/0202663 | A1* | 8/2010 | Kim | G06K 9/00355 382/107 |
| 2012/0235903 | A1* | 9/2012 | Im | G06F 3/005 345/158 |
| 2012/0314902 | A1* | 12/2012 | Kimura | G06F 3/017 382/103 |

(Continued)

OTHER PUBLICATIONS

Lee et al (NPL: Hand Gesture Recognition using Blob Detection for Immersive Projection Display System, International Scholarly and Scientific Research & Innovation 6(2) 2012).*

*Primary Examiner* — Oneal R Mistry
(74) *Attorney, Agent, or Firm* — Mohr Intellectual Property Law Solutions, PC

(57) ABSTRACT

Disclosed methods include a method of controlling a computing device includes the steps of detecting a gesture made by a human user, identifying the gesture, and executing a computer command. The gesture may comprise a change in depth of a body part of the human user relative to the 2D camera. The gesture may be detected via a 2D camera in electronic communication with the computing device. Disclosed systems include a 2D camera and a computing device in electronic communication therewith. The 2D camera is configured to capture at least a first and second image of a body part of a human user. The computing device is configured to recognize at least a first object in the first image and a second object in the second image, identify a change in depth, and execute a command in response to the change in depth.

20 Claims, 6 Drawing Sheets

(56) References Cited

U.S. PATENT DOCUMENTS

| | | | |
|---|---|---|---|
| 2014/0071044 A1* | 3/2014 | Nam | G06F 3/011 345/156 |
| 2014/0157209 A1* | 6/2014 | Dalal | G06F 3/017 715/863 |
| 2014/0300684 A1* | 10/2014 | Fagadar-Cosma | G06F 3/017 348/14.03 |
| 2015/0316996 A1* | 11/2015 | Dal Mutto | G06F 3/04815 345/156 |
| 2016/0132124 A1* | 5/2016 | Nakamura | G06K 9/00355 345/156 |

\* cited by examiner

SYSTEMS AND METHODS OF GESTURE RECOGNITION

CROSS REFERENCE TO RELATED APPLICATIONS

This application claims priority to U.S. application Ser. No. 62/023,667, filed on Jul. 11, 2014, which is hereby incorporated by reference for all purposes.

BACKGROUND

The present disclosure relates generally to systems and devices for gesture recognition. In particular, systems and devices using two-dimensional (2D) cameras that are capable of gesture recognition in three-dimensional (3D) space are described.

Gesture recognition is a rapidly growing technological field for inputting commands to computer systems, gaming systems, and/or other interactive control systems. In such systems, human gestures are captured by image and/or motion detection subsystems and interpreted via algorithms to relay specific commands to the subject system. Gestures can originate from any bodily motion or state, but commonly originate from the face or hand of a user.

Known gesture recognition devices and systems are not entirely satisfactory for the range of applications in which they are employed. For example, existing gesture recognition systems and devices have difficulty recognizing gestures that are performed in 3D space. More specifically, existing gesture recognition systems have difficulty recognizing gestures that require "depth perception", such as a forward swipe gesture (i.e., hand moving away from the device) and/or a rearward swipe gesture (i.e., hand moving toward the device). In another example, some gesture recognition systems and devices include 3D cameras (e.g., structure light cameras, time-of-flight cameras, stereo cameras, etc.) to track gestures through 3D space. These systems, however, are expensive and require complicated systems for operation.

Thus, there exists a need for gesture recognition devices and systems that improve upon and advance the design of known gesture recognition devices and systems. Examples of new and useful gesture recognition devices and systems relevant to the needs existing in the field are discussed below.

SUMMARY

In one embodiment, a method of controlling a computing device includes the steps of detecting a gesture made by a human user, identifying the gesture, and executing a computer command. The gesture may comprise a change in depth of a body part of the human user relative to the 2D camera. The gesture may be detected via a 2D camera in electronic communication with the computing device. The detecting step may include capturing at least a first image of the body part in an initial gesture position and a second image of the body part in a subsequent gesture position. The gesture may be identified via a computing unit of the computing device. The identifying step may comprise recognizing at least a first object in the first image and a second object in the second image, comparing least the first object to the second object, and converting the gesture into a command via the computing unit. The executing step may be triggered in response to the gesture being converted into a command.

In one embodiment, a system includes a 2D camera and a computing device. The computing device may be in electronic communication with the 2D camera. In the embodiment, the 2D camera is configured to capture at least a first and second image of a body part of a human user. In the embodiment, the computing device is configured to recognize at least a first object in the first image and a second object in the second image. In the embodiment, the computing device is configured to generate a first boundary in the first image, the first boundary being the smallest region of the first image that fully contains the first object. In the embodiment, the computing device is configured to generate a second boundary in the second image, the second boundary being the smallest region of the second image that fully contains the second object. In the embodiment, the computing device is configured to compare at least the size of the first boundary to the size of the second boundary in order to identify a change in depth of the body part of the human user relative to the 2D camera. In the embodiment, the computing device is configured to convert the change in depth of the body part into a command. In the embodiment, the computing device is configured to execute the command.

DETAILED DESCRIPTION

Figure 1:
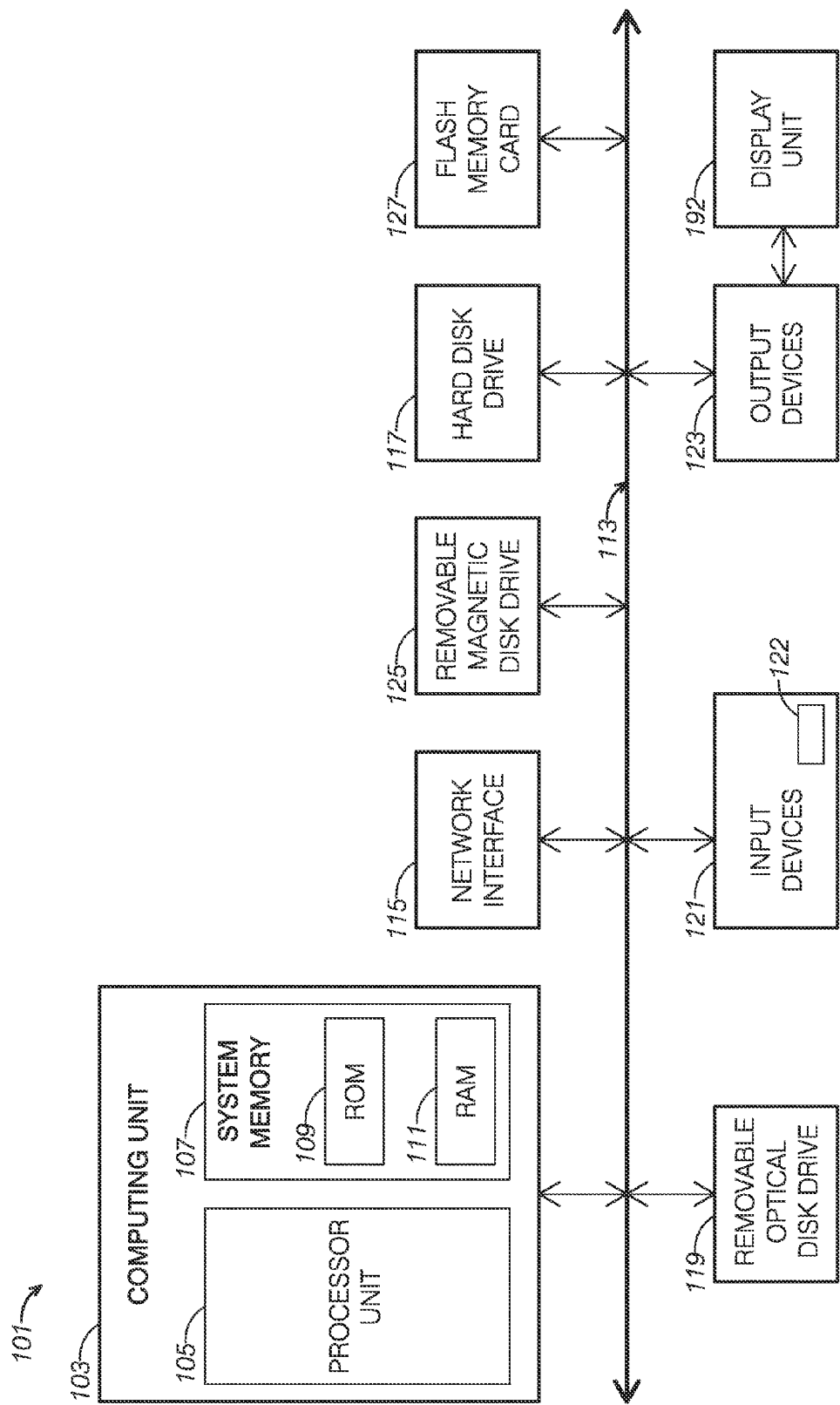
FIG. 1 shows a schematic view of an example of programmable computing device.

The disclosed WIDGETS will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various WIDGETS are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The disclosed gesture recognition systems and devices using 2D cameras for detecting gestures through 3D space will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of gesture recognition systems and devices using 2D cameras for detecting gestures through 3D space examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5 examples of gesture recognitions systems using 2D cameras to detect gestures made through 3D space, gesture recognition systems 300, 400 and 500, now be described. The presently described gesture recognition systems and devices function to detect and interpret gesture commands performed through 3D space (e.g., a forward swipe gesture, a rearward swipe gesture, etc.). Additionally or alternatively, the presently described gesture recognition systems and devices can function to detect and interpret generally 2D gesture commands (i.e., gestures made in a generally flat plane).

The presently describe gesture, recognition systems and devices address many of the shortcomings existing with conventional gesture recognition systems and devices. For example, using the gesture recognition systems of the present application, a 2D camera can be used to recognize depth and detect gestures that are made in 3D space by comparing a first boundary of a first image (i.e., an image of a beginning of a gesture) to a second boundary of a second, subsequent, image (i.e., an image of an ending of the gesture). Further, the presently described gesture recognition systems and devices do not require of 3D camera, therefore they have an overall reduced cost and complexity.

As described below, in some embodiments, the gesture recognition systems of the present application may be employed to control or interact with one or more computing devices. In this regard, it will be appreciated that various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Accordingly, FIG. 1 shows one illustrative example of a computing device, computing device 101, which can be used to implement various embodiments of the invention. Computing device 101 may be incorporated within a variety of consumer electronic devices, such as personal media players, cellular phones, smart phones, personal data assistants, global positioning system devices, smart eyewear, smart watches, other computer wearables, and the like.

As seen in this figure, computing device 101 has a computing emit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, removable magnetic disk drive 125, and a flash memory card 127. Processing unit 105 and system memory 107 also may be directly or indirectly connected to one or more input devices 121 and one or more output devices 123.

Output devices 123 may include, for example, a monitor display, an integrated display, television, printer, stereo, or speakers. Input devices 121 may include, for example, a keyboard, touch screen, a remote control pad, a pointing device (such as a mouse, touchpad, stylus, trackball, or joystick), a scanner, a microphone, or a camera.

More specifically, in the presently described gesture recognition systems, input devices 121 include at least a 2D camera 122 (e.g., a light camera, a thermographic camera, etc.). In one example, 2D camera 122 is a visible light digital camera. The visible light digital camera uses an optical system including a lens and a variable diaphragm to focus light onto an electronic image pickup device. The visible light digital camera can be a compact digital camera, a bridge camera, a mirrorless interchangeable-lens camera, a modular camera, a digital single-lens reflex camera, digital single-lens translucent camera, line-scan camera, etc. Further, it will be appreciated that the visible light digital camera can be any known or yet to be discovered visible light digital camera.

In one embodiment, 2D camera 122 is integral to the computing device 103. In another embodiment, 2D camera 122 is remote of the computing device 103.

As mentioned above, 2D camera 122 can additionally or alternatively be a thermographic camera or infrared (IR) camera. The IR camera can detect heat radiation in a way similar to the way an ordinary camera detects visible light. This makes IR cameras useful for gesture recognition in "normal light", "low light", and/or "no light" conditions. The IR camera can include cooled infrared photodetectors (e.g. indium antimonide, indium arsenide, mercury cadmium telluride, lead sulfide, lead selenide, etc.) and/or uncooled infrared photodetectors (e.g., vanadium oxide, lanthanum barium manganite, amorphous silicon, lead zirconate titanate, lanthanum doped lead zirconate titanate, lead scandium tantalate, lean lanthanum titanate, lead titanate, lead zinc niobate, lead strontium titanate, barium strontium titanate, antimony sulfoiodide, polyvinylidene difluoride, etc.). Further, it will be appreciated that the IR camera can be any known or yet to be discovered thermographic camera.

Returning to FIG. 1, computing unit 103 can be directly or indirectly connected to one or more network interfaces 115 for communicating with a network. This type of network interface 115, also sometimes referred to as a network adapter or network interface card (NIC), translates data and control signals from computing unit 101 into network messages according to one or more communication protocols, such as the Transmission Control Protocol (TCP), the Internet Protocol (IP), and the User Datagram Protocol (UDP). These protocols are well known in the art, and this will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computing device 101 may be connected to a digital music player, such as an IPOD® brand digital music player or iOS or Android based smartphone. As known in the art, this type of digital music player can serve as both an output device for a computing device (e.g., outputting music from a sound file or pictures from an image file) and a storage device.

In addition to a digital music player, computing device 101 may be connected to or otherwise include one or more other peripheral devices. In one example, computing device 101 may be connected to or otherwise include a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computing device 101 so that their data maintained may be synchronized.

Figure 3:
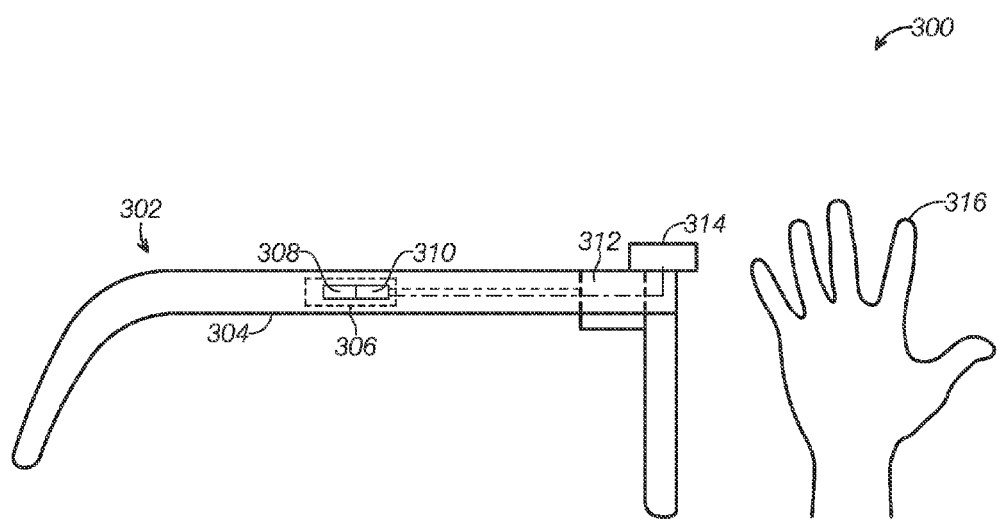
FIG. 3 is a schematic view of a first example of a gesture recognition system.

In another example, computing device 101 may be connected to or otherwise include an eyewear article (such as eyewear article 302 shown in FIG. 3). The eyewear article may be, for example, a "smart" eyewear article, such as a wearable computing device like Google® Glass.

The "smart" eyewear technologies are particularly suited to the display of "augmented reality" displays. "Augmented reality" displays comprise a computer generated graphical display laid over a portion of a user's or mobile device's natural field of vision. These "augmented reality" displays allow a user to view computer generated images including data related to objects in their natural field of vision. Augmented reality displays may include any display including both natural and computer generated elements.

Of course, still other peripheral devices may be included with or otherwise connected to a computing device 101 of the type illustrated in FIG. 1, as is well known in the art. In some cases, a peripheral device may be permanently or semi-permanently connected to computing unit 103. For example, with many computing devices, computing unit 103, hard disk drive 117, removable optical disk drive 119 and a display are semi-permanently encased in a single housing.

Still other peripheral devices may be removably connected to computing device 101, however. Computing device 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computing device 101 may include a wireless data "port," such as a Bluetooth interface, a Wi-Fi interface, an infrared data port, or the like.

It will be appreciated that a computing device employed according various examples of the invention may include more components than computing device 101 illustrated in FIG. 1, fewer components than computing device 101, or a different combination of components than computing device 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computing devices may comprise mobile electronic devices, such as smart phones, smart glasses, tablet computers, or portable music players, often operating the iOS, Symbian, Windows-based (including Windows Mobile and Windows 8), or Android operating systems.

Figure 2:
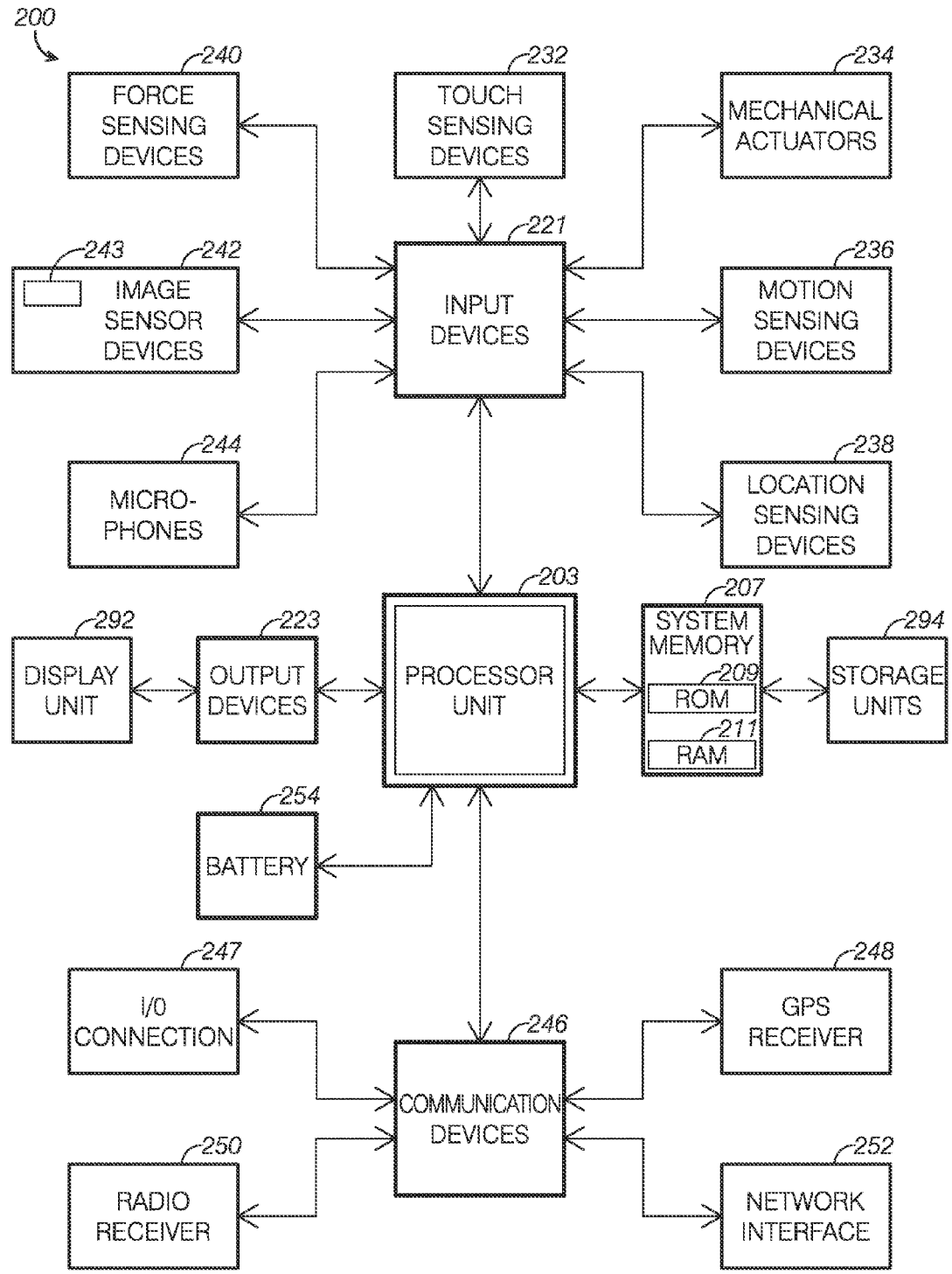
FIG. 2 shows a schematic view of an example of a mobile electronic device.

With reference to FIG. 2, an exemplary computing device, mobile device 200, may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessor, DSP, A/D converters, D/A converters, compression, decompression, etc.

In most cases, the controller together with an operating system operates to execute computer code and produce and use data. The operating system may correspond to well-known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a lard disk drive, flash memory etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. To particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite receivers, WiFi based location detection functionality, or cellular radio based location detection functionality, force sensing devices 240 such as force sensitive displays and housings, image sensors 242 such as light cameras and/or IR cameras, and microphones 244. Input devices 221 may also include a clickable display actuator.

More specifically, in the presently described gesture recognition systems, input devices 221 include at least a 2D camera 243 (one of image sensing devices 242). 2D camera 243 can be a visible light camera and/or a thermographic camera, such as those described above in reference to 2D camera 122. Accordingly, 2D camera 243 has the same functions and capabilities as those described above in reference to 2D camera 122.

Returning to FIG. 2, mobile device 200 also includes various output devices 223 that are operatively coupled to processor unit 203. Output devices 233 are configured to transfer data from mobile device 200 to the outside world. Output devices 233 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable, means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations described above can be used alone or in various combinations with the gesture recognition methods disclosed herein. The methods disclosed herein can be implemented by software, hardware or a combination of hardware and software. The methods can also be embodied as computer readable code on a computer readable medium (e.g. a non-transitory computer readable-storage medium). The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 4A:
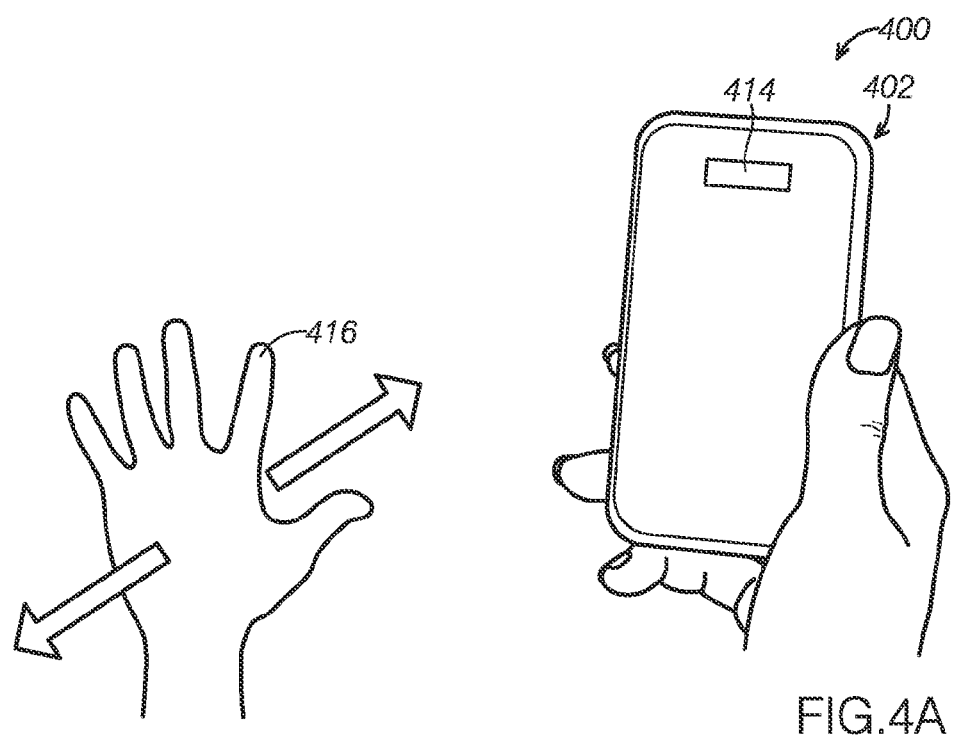
FIGS. 4A and 4B are schematic views of a second example of a gesture recognition system and a third example of the gesture recognition system, respectively.
Figure 4B:
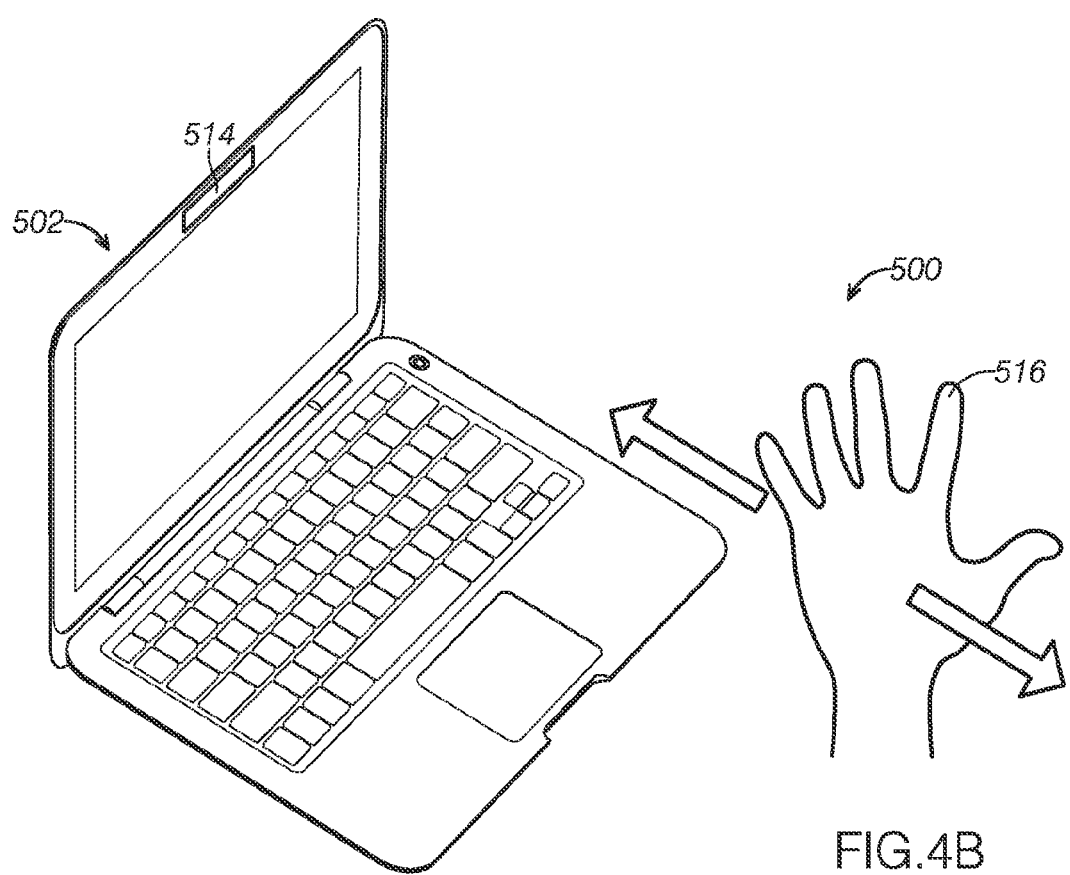

Turning now to FIGS. 3-4B example gesture recognitions systems are shown and described. As depicted in FIG. 3, a first example of a gesture recognition system, gesture recognition system 300, is shown implemented an eyewear article 302. Eyewear article 302 is a smart eyewear article, such as those described above in reference to FIGS. 1 and 2. Accordingly, eyewear article 302 includes a frame 304 for supporting a computing device 306 (such as computing device 101) including at least a processor 308 and memory 310 in data communication with an image generator 312 and a 2D camera 314. Image generator is configured to display and/or project an image into the of a user wearing eyewear article 302, creating an augmented reality view.

2D camera 314 can be any of the cameras described above in reference to 2D camera 122. 2D camera 314 is configured to detect a gesture 316 that changes in depth relative to the camera (i.e., moves away from the camera or moves toward the camera). In the present example, gesture 316 is an open hand gesture; however, it be appreciated that 2D camera 314 can detect a variety of other hand gestures closed hand, open hand, swipe right, swipe left, swipe forward, swipe backward, etc.) and/or a variety of gestures (e.g., wink of eye, blink of eyes, head movements up, down, right, and/or left, etc.). A gesture may comprise a movement from an initial gesture position to a subsequent gesture positions. As used herein, a gesture position is a particular orientation of a body part of person. It will be further appreciated that gesture 316 and/or any other gesture detected by 2D camera 314 can be a gesture made by a user (i.e., a wearer of the eye wear article) or a gesture made by another person.

A second example of a gesture recognition system, gesture recognition system 400, is shown in FIG. 4A and will now be described. Gesture recognition system 400 includes many similar or identical features to gesture recognition system 300. Thus, for the sake of brevity, each feature of gesture recognition system 400 will not be redundantly explained. Rather, key distinctions between gesture recognition system 400 and gesture recognition system 300 will be described in detail and the reader should reference the discussion above for features substantially similar between the gesture recognition systems.

As can be seen in FIG. 4A, gesture recognition system 400 is implemented in a mobile computing device 402 including a 2D camera 414 in data communication with a computing unit (not specifically shown) of the mobile device for detecting a gesture 416. In the present example, mobile device 402 is a smart phone. It will be appreciated that in other examples mobile device 402 can be any of the mobile devices described above in reference to mobile device 200 (shown in FIG. 2).

2D camera 414 can be any of the cameras described above in reference to 2D camera 122. 2D camera 414 is configured to detect a gesture 416 that changes in depth relative to the camera (i.e., moves away from the camera or moves toward the camera). In the present example, gesture 416 is an open hand gesture; however, it will be appreciated that 2D camera 414 can detect a variety of other hand gestures (e.g., closed hand, open hand, swipe right, swipe left, swipe forward, swipe backward, etc.) and/or a variety of gestures (e.g., wink of eye, blink of eyes, head movements up, down, right, and left, etc.).

A third example of a gesture recognition system, gesture recognition system 500, is shown in FIG. 4B and will now be described. Gesture recognition system 500 includes many similar or identical features to gesture recognition systems 300 and 400. Thus, for the sake of brevity, each feature of gesture recognition system 500 will not be redundantly explained. Rather, key distinctions between gesture recognition system 500 and gesture recognition systems 300 and 400 will be described in detail and the reader should reference the discussion above for features substantially similar between the gesture recognition systems.

As can be seen in FIG. 4B, gesture recognition system 500 is implemented in a computing device 502 including a 2D camera 514 in data communication with a processor and memory of the computing device (not specifically shown) for detecting a gesture 516. In the present example, computer device 502 is a laptop computer. It will be appreciated that in other examples computing device 502 can be any of the mobile devices described above in reference to computing device 101 (shown in FIG. 1).

2D camera 514 can be any of the cameras described above in reference to 2D camera 122. 2D camera 514 is configured to detect a gesture 516 that changes in depth relative to the camera (i.e., moves away from the camera or moves toward the camera). In the present example, gesture 516 is an open hand gesture; however, it will be appreciated that 2D camera 514 can detect a variety of other hand gestures (e.g., closed hand, open hand, swipe right, swipe left, swipe forward, swipe backward, etc.) and/or a variety of gestures (e.g., wink of eye, blink of eyes, head movements up, down, right, and/or left, etc.).

Figure 5A:
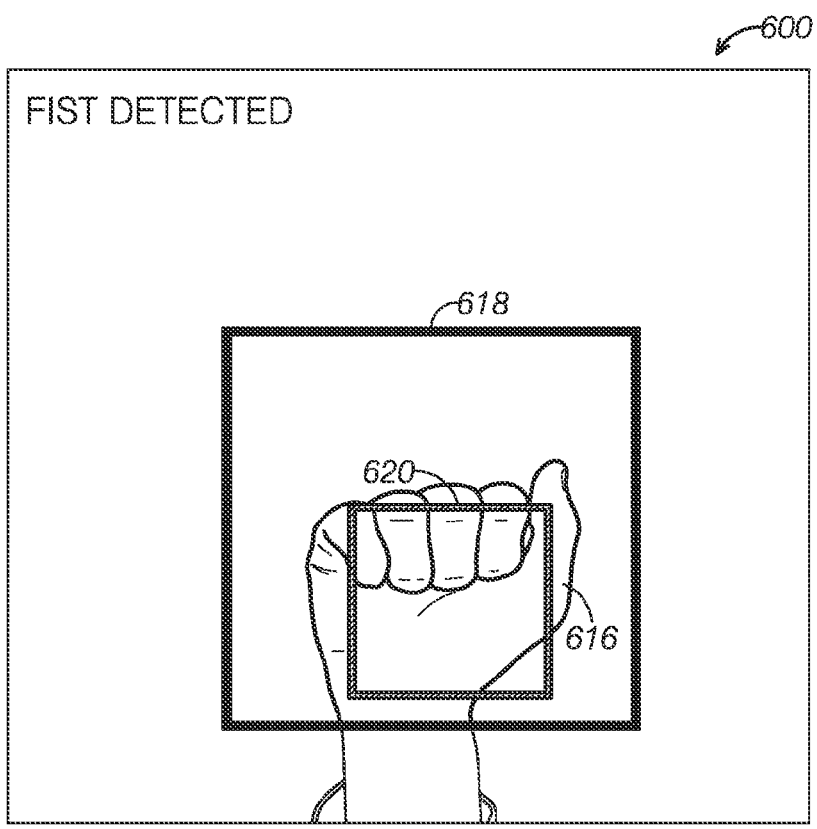
FIGS. 5A and 5B are example camera views of example hand gestures from any of the first, second, or third example gesture recognition systems.

Turning now to FIGS. 5A-6B, example camera views and boundaries as detected and calculated by a camera in the above described systems (e.g., cameras 122, 243, 314, 414, and 514). Specifically, FIG. 5A shows camera view 600 of a first example gesture made by a user, closed hand gesture 616 (i.e., a fist). Closed hand gesture 616 is recognized and identified as a "closed hand command" by a system in data communication with the camera. In one specific example, a "closed hand command" is a command to select/grab an image on a screen and/or a virtual image. In another specific example, a "closed hand command" is a command to capture an image. In even another specific example, a "closed hand command" is a command to select and/or move forward through a series of screens and/or modes. Further, movement of gesture 616 is tracked by the system via the collected camera images.

In the example of camera view 600, a first boundary 618 is generated and/or calculated when the user's hand is in an initial gesture position. A second boundary 620 is generated when the user's hand is a subsequent gesture position.

Thus, in this example, gesture 616 is tracked as it moves away from the camera. In other words, gesture 616 is a rearward moving gesture. The movement of gesture 616 is recognized and identified by the system and a command is sent to the image generator to execute the command. In one specific example, a rearward movement triggers a command to decrease a size of a virtual image in an augmented reality view (i.e., a "zoom out command"). In other embodiments, a rearward movement may trigger a command to adjust the volume up, adjust the volume down, scroll up, scroll down, turn on, turn off, open an application, or close an application, among others.

Figure 5B:
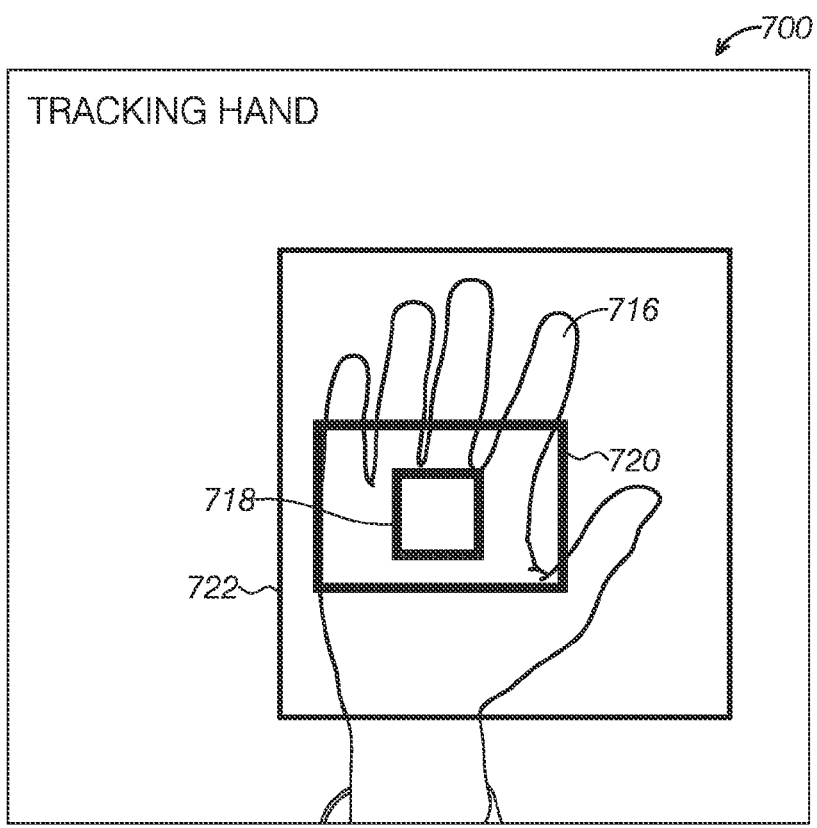

FIG. 5B depicts a camera view of a second example gesture made by a user, an open hand gesture 716 (i.e., an open palm). Open hand gesture 716 is recognized and identified as an "open hand command" by a system in data communication with the camera. In one specific example, a "open hand command" is a command to select/grab an image on a screen and/or a virtual image. In another specific example, an "open and command" is a command to select and/or move backward through a series of screens and/or modes. Further, movement of gesture 716 is tracked by the system via the collected camera images.

In the example of camera view 700, a first boundary 718 is generated and/or calculated when the user's hand is in an initial gesture position. A second boundary 720 is generated when the user's hand is a first subsequent gesture position, and a third boundary 722 is generated when a user's hand is in a second subsequent gesture position (i.e., a position after the first subsequent gesture position).

Thus, in this example, gesture 716 is tracked as it toward the camera. In other words, gesture 716 is a forward moving gesture. The movement of gesture 716 is recognized and identified by the system and a command is sent to the image generator to execute the command. In one specific example, a forward movement is a command to increase a size of a virtual image in an augmented reality vie a "zoom in command"). It will be appreciated that a forward movement can be associated with a different command (i.e., a turn off command, a turn on command, etc.).

Figure 6A:
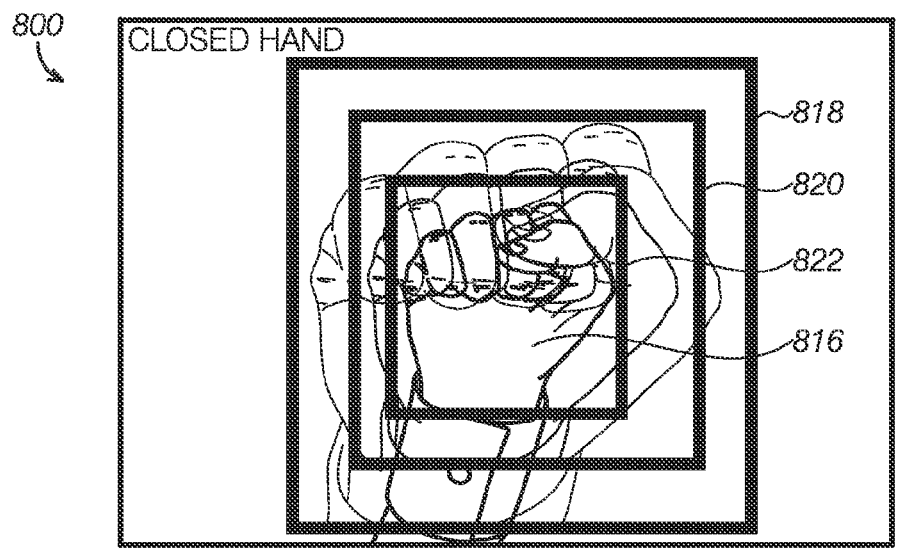
FIGS. 6A-6C are example camera views of overlain hand gesture movement images from any of the first, second, or third example gesture recognition systems.
Figure 6B:
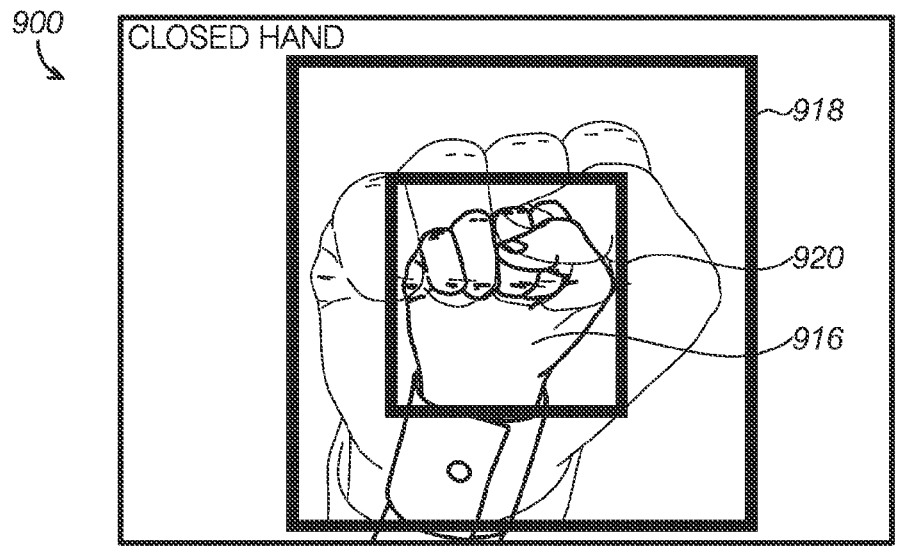
Figure 6C:
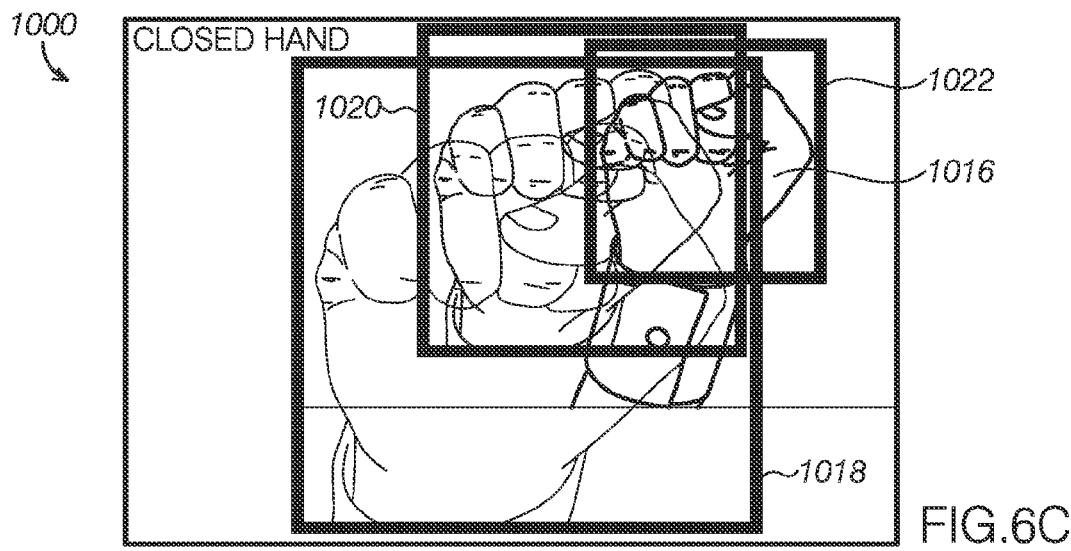

FIGS. 6A-6C, show overlaid successive camera views 800, 900, and 1000, respectively. Each of these views shows a closed hand gesture moving away from the camera (i.e., a rearward moving gesture). In the example of FIG. 6A, three successive boundaries are calculated, boundaries 818, 820, and 822 for a closed hand gesture 816. In the example of FIG. 6B, two successive boundaries, boundaries 918 and 920, are calculated for closed hand gesture 916. In the example of FIG. 6C, three successive boundaries, boundaries 1018, 1020, and 1022, are calculated for a closed hand gesture 1016. In the example of FIG. 6C, gesture 1018 is a rearward and rightward moving gesture. In this example, the rearward and rightward moving gesture can include an additional or alternative command. For example, in an augmented reality display a rearward and rightward gesture can be a "zoom out" and "move right" command for movement of virtual image.

It will be appreciated that different hand signs (e.g. open hand, closed hand, etc.) can be recognized and identified as different objects by a system in data communication with a camera. The change in depth (e.g., rearward movement, forward movement, etc.) is recognized when the same hand sign is detected in successive camera frames with a changing size. Thus, in one embodiment, the computing device 103 is configured to identify a first object in a first image and second object in a second image. The first object may be indicative of an initial gesture position. For example, the first object may be a hand sign, or a portion of a hand sign. The second object may be indicative of a subsequent gesture position. For example, the second object may be the same hand sign, or portion thereof, however the second object may be a different size than the first object.

As soon as a different hand sign/gesture is detected, the depth gesture that was in progress can be considered completed. Thus, in some embodiments, after identifying a first initial gesture position, and then identifying a second initial gesture position, the computing device 103 is configured to terminate any command associated with the first initial gesture position.

A boundary (e.g., boundaries 616, 618, 718, 720, 722, 818, 820, 822, 918, 920, 1018, 1020, and/or 1022) can be calculated using an object detection algorithm. Suitable object detection algorithms include the Haar Cascade Classifier algorithm that finds objects in an image that closely match a given set of image features, and the HOG detector classifier. The search is done by comparing regions of the full image against the features being searched for. The smallest region that fully contains the matching object is considered the object's boundary. Subsequent boundaries can be generated over time, creating two or more bounding regions. In some embodiments, the regions have predetermined shapes. For example the regions may be specified as rectangles, circles, triangles, and trapezoid, among others.

Depth is calculated comparing the relative widths and/or heights of the two or more bounding regions. In some instances, relative width or height is used depending on whether the hand position being used for the gesture is bigger horizontally or vertically. When a subsequent bounding region is bigger in whichever dimension is being used for the comparison (e.g., height, width, circumference, and/or area) than an initial bounding region, the hand is considered to have moved closer to the camera (i.e., a forward moving gesture). When a subsequent bounding region is smaller than the initial bounding region, the hand is considered to have moved farther from the camera (i.e., a rearward moving gesture).

The magnitude of the depth change may be quantified, via computing unit 103, by scaling the difference in width and/or height by an application—and/or device-specific constant. Thus, the magnitude of the change in depth may be quantified. In this regard, a magnitude may be associated with a gesture triggered command. For example, a gesture comprising a change in depth of 2 ft. may be converted, via computing unit 103, into a command to decrease the size of an image on a display unit (i.e., "zoom out") by a factor of 200%. In another example, a gesture comprising a change in depth of 1 ft. may be converted, via computing unit 103, into a command to decrease the size of an image on a display unit by a factor of 100%. As can be appreciated, a magnitude may be associated with any of the commands discussed above.

Optionally, the scaling constant can also change dynamically based on the speed of the gesture. For example, the scaling constant can be changed dynamically by dividing the magnitude by the time difference between the two or more bounding regions, which would cause the depth change magnitude to be bigger when the gesture is performed at a faster speed.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method of controlling a computing device, the method comprising:

detecting, via a 2D camera in electronic communication with the computing device, a gesture made by a human user of the computing device;

wherein the gesture comprises a change in depth of a body part of the human user relative to the 2D camera wherein depth is a dimension that is measured parallel to a line extending perpendicularly from a lens of the 2D camera; and wherein the detecting step comprises capturing at least:

a first image of the body part in an initial gesture position at an initial depth; and a second image of the body part in a subsequent gesture position at a subsequent depth, wherein the subsequent depth is different than the initial depth;

identifying the gesture via a computing unit of the computing device, wherein the identifying step comprises:

recognizing at least a first object in the body part of the first image and a second object in the body part of the second image, wherein the recognizing step comprises:

generating a first boundary in the first image that fully contains the first object, wherein the first object corresponds to the body part in the initial gesture position;

generating a second boundary in the second image that fully contains the second object, wherein the second object corresponds to the body part in the subsequent gesture position;

determining the change in magnitude depth from the initial gesture position to the subsequent gesture position, wherein the determining comprises comparing the relative width and height size of the first boundary to a size of the second boundary and scaling the difference in the width and the height of the first boundary and the second boundary;

using a scaling constant that is changed dynamically by dividing the magnitude depth by the time difference between the first boundary and second boundary, converting the gesture into a command via the computing unit; and executing, in response to the converting step, the command via the computing unit.

2. The method of claim 1, wherein the recognizing step includes using an object detection algorithm to recognize the first and second objects.

3. The method of claim 2, wherein the object detection algorithm is selected from the group consisting of a Haar Cascade Classifier and a HOG Detector Classifier.

4. The method of claim 1, wherein the first boundary is the smallest region of the first image that fully contains the body part of the human user, and wherein the second boundary is the smallest region of the second image that fully contains the body part of the human user.

5. The method of claim 1, wherein:
when the first object is smaller than the second object, the gesture is identified as a forward moving gesture; and
when the first object is larger than the second object, the gesture is identified as a rearward moving gesture.

6. The method of claim 5, comprising converting a rearward moving gesture into a command to decrease a size of an image on a display unit in electronic communication with the computing device.

7. The method of claim 5, comprising converting a foreword moving gesture into a command to increase a size of an image on a display unit in electronic communication with the computing device.

8. The method of claim 1, wherein the comparing step includes quantifying the difference between the size of the first object and the second object via scaling constant; and
wherein the converting step includes generating a magnitude associated with the command, wherein the magnitude is based on the quantified difference in size between the first object and the second object.

9. The method of claim 8, wherein the comparing step includes analyzing the speed of the gesture, and wherein the converting step includes adjusting the magnitude associated with the command based on the speed of the gesture.

10. The method of claim 1, wherein the initial gesture position is a particular orientation of the body part of the human user.

11. The method of claim 10, wherein the initial gesture position is selected from the group consisting of an open hand and a closed hand.

12. The method of claim 1, wherein the comparing step comprises at least one of: a width of the first boundary to a width of the second boundary, a height of the first boundary to a height of the second boundary, and an area of the first boundary to an area of the second boundary.

13. The method of claim 1, comprising evaluating a direction in the change of depth, wherein when the first boundary is smaller than the second boundary the body part is considered to have moved closer to the 2D camera, and when the first boundary is larger than the second boundary the body part is considered to have moved farther from the 2D camera.

14. A system comprising:
a 2D camera configured to capture at least a first and second image of a gesture made by a human user, wherein the gesture comprises a change in depth of a body part of the user relative to the 2D camera, and wherein depth is a dimension that is measured parallel to a line extending perpendicularly from a lens of the 2D camera
a computing device in electronic communication with the 2D camera configured to:
recognize at least a first object in the body part of the first image and a second object in the body part of the second image, wherein the first object corresponds to the body part in an initial gesture position at an initial depth and the second object corresponds to the body part in a subsequent gesture position at a subsequent depth, and wherein the subsequent depth is different than the initial depth;
generate a first boundary in the first image, the first boundary being the a smallest region of the first image that fully contains the first object;
generate a second boundary in the second image, the second boundary being the a smallest region of the second image that fully contains the second object;
compare at least a size of the first boundary to a size of the second boundary in order to identify the change in magnitude depth of the body part of the human user relative to the 2D camera, wherein the comparing comprises comparing the relative width and height size of the first boundary to a size of the second boundary and scaling the difference in the width and the height of the first boundary and the second boundary;
using a scaling constant that is changed dynamically by dividing the magnitude depth by the time difference between the first boundary and second boundary,
convert the change in depth of the body part into a command; and
execute the command.

15. The system of claim 14, wherein the computing device is configured to recognize the first and second objects via an object detection algorithm.

16. The system of claim 14, wherein the computing device is configured to identify a first initial gesture position.

17. The system of claim 16, wherein the computing device is configured to identify a second initial gesture position and terminate the first command in response to the identification of the second initial gesture position.

18. The system of claim 14, wherein the 2D camera is integral to the computing device.

19. The system of claim 14, wherein the 2D camera is remote of the computing device.

20. A system comprising:
a 2D camera configured to capture at least a first and second image of a gesture made by a human user, wherein the gesture comprises a change in depth of a body part of the user relative to the 2D camera, and wherein depth is a dimension that is measured parallel to a line extending perpendicular from a lens of the 2D camera;
a computing device in electronic communication with the 2D camera configured to:
recognize at least a first object in the body part of the first image and a second object in the body part of the second image wherein the first object corresponds to the body part in an initial gesture position at an initial depth and the second object corresponds to the body part in a subsequent gesture position at a subsequent depth, and wherein the subsequent depth is different than the initial depth;
generate a first boundary in the first image, the first boundary being the a smallest region of the first image that fully contains the first object;
generate a second boundary in the second image, the second boundary being the smallest region of the second image that fully contains the second object;
compare at least the size of the first object to the size of the second object in order to identify a change in magnitude depth of the body part of the human user relative to the 2D camera, wherein the comparing comprises comparing the relative width and height size of the first boundary to a size of the second boundary and scaling the difference in the width and the height of the first boundary and the second boundary;

using a scaling constant that is changed dynamically by dividing the magnitude depth by the time difference between the first boundary and second boundary,
convert the change in depth of the body part into a command;
execute the command; and
a display unit in electronic communication with the computing device configured to display a virtual image to the human user.

* * * * *